United States Patent [19]
Lin

[11] Patent Number: 5,615,021
[45] Date of Patent: Mar. 25, 1997

[54] PRINT N-TONE IMAGES WITH IMPERCEPTIBLE DOTS

[75] Inventor: Qian Lin, Santa Clara, Calif.

[73] Assignee: Hewlett-Packard Company, Palo Alto, Calif.

[21] Appl. No.: 459,143

[22] Filed: Jun. 2, 1995

Related U.S. Application Data

[63] Continuation of Ser. No. 205,215, Mar. 2, 1994, abandoned.

[51] Int. Cl.⁶ .................................................. H04N 1/40
[52] U.S. Cl. ........................................ 558/455; 358/458
[58] Field of Search ..................................... 382/254, 270;
  358/455, 456, 457, 458, 465, 466, 429;
  347/131

[56] References Cited

U.S. PATENT DOCUMENTS

| | | | |
|---|---|---|---|
| 4,455,562 | 6/1984 | Dolan et al. | 346/154 |
| 4,680,645 | 7/1987 | Dispoto et al. | 358/298 |
| 4,701,811 | 10/1987 | Moriguchi et al. | 358/458 |
| 4,802,105 | 1/1989 | Suzuki | 395/109 |
| 4,974,067 | 11/1990 | Suzuki et al. | 358/458 |
| 5,086,484 | 2/1992 | Katayama et al. | 382/270 |
| 5,111,310 | 5/1992 | Parker et al. | 358/456 |
| 5,278,670 | 1/1994 | Eschbach | 358/455 |
| 5,309,526 | 5/1994 | Pappas et al. | 382/56 |
| 5,341,224 | 8/1994 | Eschbach | 382/50 |
| 5,387,983 | 2/1995 | Sugiura et al. | 382/254 |
| 5,488,673 | 1/1996 | Katayama et al. | 382/270 |
| 5,497,180 | 3/1996 | Kawakami et al. | 347/131 |

OTHER PUBLICATIONS

Ulichney, Robert, "Digital Halftoning", The MIT Press, 1987, Chapter 9.3, pp. 340–341.
Floyd, Robert et al., "An Adaptive Algorithm for Spatial Greyscale", Proceedings of the Society of Information Display, vol. 17, 1976, pp. 75–77.

Primary Examiner—Jose L. Couso

[57] ABSTRACT

Generating a N-tone image relatively inexpensively with substantially imperceptible dots. The method generates the N-tone image from a grey scale image, both images have many pixels, with each pixel in the grey scale image having a grey level that is within a maximum and a minimum level, and with each pixel in the N-tone image having a level that is one of N levels with N bigger than two and less than the number of levels available for the grey scale image. The method includes the steps of determining the level of each pixel in the N-tone image based on the levels of its corresponding pixel in the grey scale image, and based on either an original dither matrix or an error diffusion technique. Each pixel is modelled by a number of sub-pixels, and each sub-pixel is modelled by a number of segments. Each segment has an intensity whose value depends on its corresponding pixel. The different intensities of the segments when combined together generate N substantially reproducible levels for the N-tone image. Based on the modelling step, the N-tone image is generated with substantially imperceptible dots.

9 Claims, 20 Drawing Sheets

| | | |
|---|---|---|
| 255 | — | 253 | — 202
| 253 | — | 249 |
| 249 | — | 237 |
| 237 | — | 222 |
| 222 | — | 200 |
| 200 | — | 187 |
| 187 | — | 163 |
| 163 | — | 145 |
| 145 | — | 126 |
| 126 | — | 100 |
| 100 | — | 83 |
| 83 | — | 56 |
| 56 | — | 31 | — 206
| 31 | — | 12 | — 208
| 12 | — | 0 |
| 0 | — | 0 | — 210

*FIG. 2*

| 12 | 8 | 1 | 3 |
|----|---|----|---|
| 10 | 6 | 1 | 1 |
| 4 | 2 | 11 | 7 |
| 1 | 1 | 9 | 5 |

*FIG. 13*

| | | |
|---|---|---|
| 255 | — | 243 |
| 243 | — | 213 |
| 213 | — | 185 |
| 185 | — | 157 |
| 157 | — | 135 |
| 135 | — | 116 |
| 116 | — | 107 |
| 107 | — | 77 |
| 77 | — | 65 |
| 65 | — | 30 |
| 30 | — | 22 |
| 22 | — | 0 |
| 0 | — | 0 |

*FIG. 14*

PRINT N-TONE IMAGES WITH IMPERCEPTIBLE DOTS

CROSS REFERENCE TO RELATED APPLICATION(S)

This is a continuation of application Ser. No. 08/205,215 filed on Mar. 2, 1994, now abandoned.

BACKGROUND OF THE INVENTION

The present invention relates generally to printing an image and more particularly to printing an image with N-tones.

Numerous methods are available to print a halftone image from a grey scale image. The methods usually involve establishing the approximate grey level of each pixel of the grey scale image, and then, based on some representation schemes, printing dots to represent the grey scale image.

One form of representation scheme depends on a dither matrix, which has the same number of pixels as the grey scale image. Each pixel in the matrix has a level, which is compared to the level of its corresponding pixel in the grey scale image to produce the level of a pixel in the halftone image. A general discussion of a dither matrix to render an image can be found in "Digital Halftoning," by R. Ulichney (1987). Another representation scheme is known as the error diffusion technique, with a general discussion found in "An Adaptive Algorithm for Spatial Greyscale," written by Floyd and Steinberg, and published in the Proc. SID, Volume 17, pages 75–77, 1976.

In printing the halftone image, it is preferred to have inconspicuous dots in the image. There is a constant need to generate an image with imperceptible dots.

One method to generate such a visually pleasing image is to significantly increase the resolution of the halftone image to a high number of dots-per-inch, such as 2400. The machine implementing such a high resolution printing is usually very expensive because the particle to generate each dot has to be very small, which can be difficult for normal dry toner particles of laser printers. Moreover, each dot has to be positioned very accurately onto the desired location.

It should be apparent from the foregoing that there is still a need for a method to print an image with imperceptible dots in an inexpensive manner.

SUMMARY OF THE INVENTION

The present invention is on methods and apparatus to generate, from a grey scale image, an image with substantially imperceptible dots in an inexpensive manner. The method is based on generating a N-tone image, instead of a halftone image. Prior methods to generate such a visually pleasing image usually requires a very high resolution printing machine, which is quite expensive. The present invention depends on relatively inexpensive printers with relatively low resolution, but the image generated is similar to a photograph with substantially imperceptible dots.

The grey scale image and the N-tone image have many pixels. Each pixel in the grey scale image has a level that is within a maximum and a minimum level. Each pixel in the N-tone image has a level that is one of N levels, with N bigger than two and less than the number of levels available for the grey scale image.

In one preferred embodiment, the level of each pixel in the N-tone image is determined based on the levels of its corresponding pixel in the grey scale image and based on either an original dither matrix or an error diffusion technique.

Every pixel in the N-tone image is modelled by replacing it with a number of sub-pixels, and every sub-pixel with a number of segments. Each segment has an intensity that depends on the level of its corresponding pixel. The different intensities of the segments when combined together can generate N substantially reproducible levels for their corresponding pixel.

Based on the modelling, the N-tone image is printed with substantially imperceptible dots.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 2 shows a preferred table of groups of grey levels to generate a N-tone image for the first preferred embodiment.

FIG. 13 shows the turn-on sequence of the sub-pixels to generate 13 different levels for the second preferred embodiment.

FIG. 14 shows one table of groups of grey levels for the second preferred embodiment.

Same numerals in FIGS. 1–20 are assigned to similar elements in all the figures. Embodiments of the invention are discussed below with reference to FIGS. 1–20. However, those skilled in the art will readily appreciate that the detailed description given herein with respect to these figures is for explanatory purposes as the invention extends beyond these limited embodiments.

DETAILED DESCRIPTION OF THE INVENTION

Figure 1:
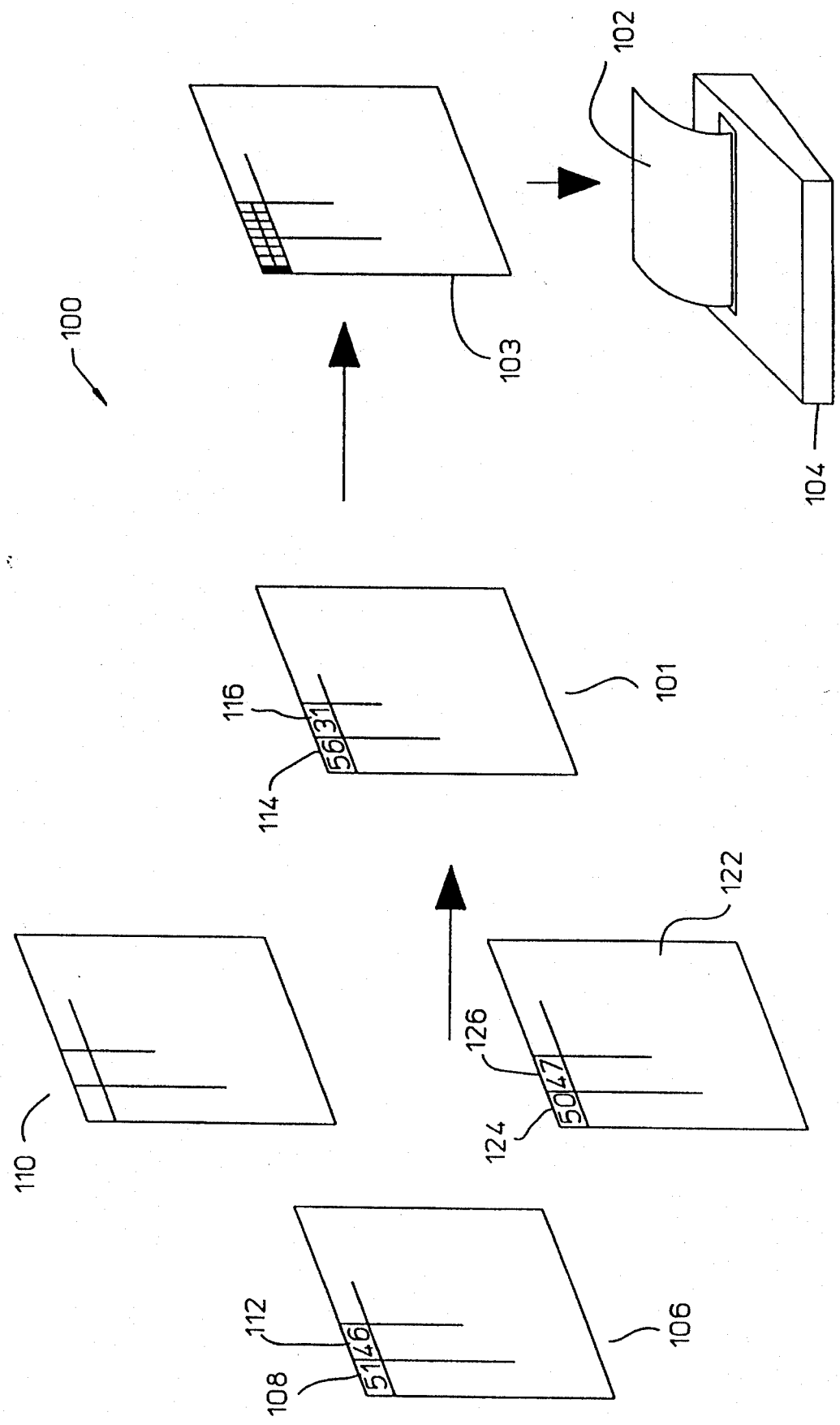
FIG. 1 shows a representation of the first preferred embodiment of the invention.

FIG. 1 shows a representation of the first preferred embodiment 100 of the invention, which prints a N-tone image 102 by a printer, a plotter or other imprinting device 104 from a grey scale image 106. The N-tone image 102 has two intermediate forms, the first intermediate N-tone image 101 and the second intermediate N-tone image 103. The images have many pixels; for example, the grey scale image 106 has pixels 108 and 112; and the first intermediate N-tone image 101 has pixels 114 and 116.

Each pixel in the grey scale image has a level that is within a maximum and a minimum level. For example, the maximum level is 255 and the minimum level is 0; each level represents one grey level of the grey scale image 106.

The first intermediate N-tone image 101 has N levels, with N preferably greater than 2. The level of each pixel in the first intermediate N-tone image 101 is from one of the N levels. The N levels are selected from the grey levels in the grey scale image 102 by dividing the grey levels into N groups. Each group of grey levels has a group maximum level, which is the maximum level in the group and is one of the N levels. The separations between adjacent levels in the N levels are non-uniform. The method to set the non-uniformity will be described later in the specification.

FIG. 2 shows an example of a preferred table of groups of grey levels to generate a N-tone image with 16 levels. The sixteenth group 202 covers the range of grey levels between 255 to 253 with its group maximum level being 255. Every group is represented by its group maximum level. The entire 16 groups give rise to 16 group maximum levels, which represent the 16 levels of the N-tone image.

The first preferred embodiment includes a number of multi-level dither matrices 118, such as the multi-level dither matrix 122. Each multi-level dither matrix has many pixels, such as the matrix 122 has pixels 124 and 126.

Figure 3:
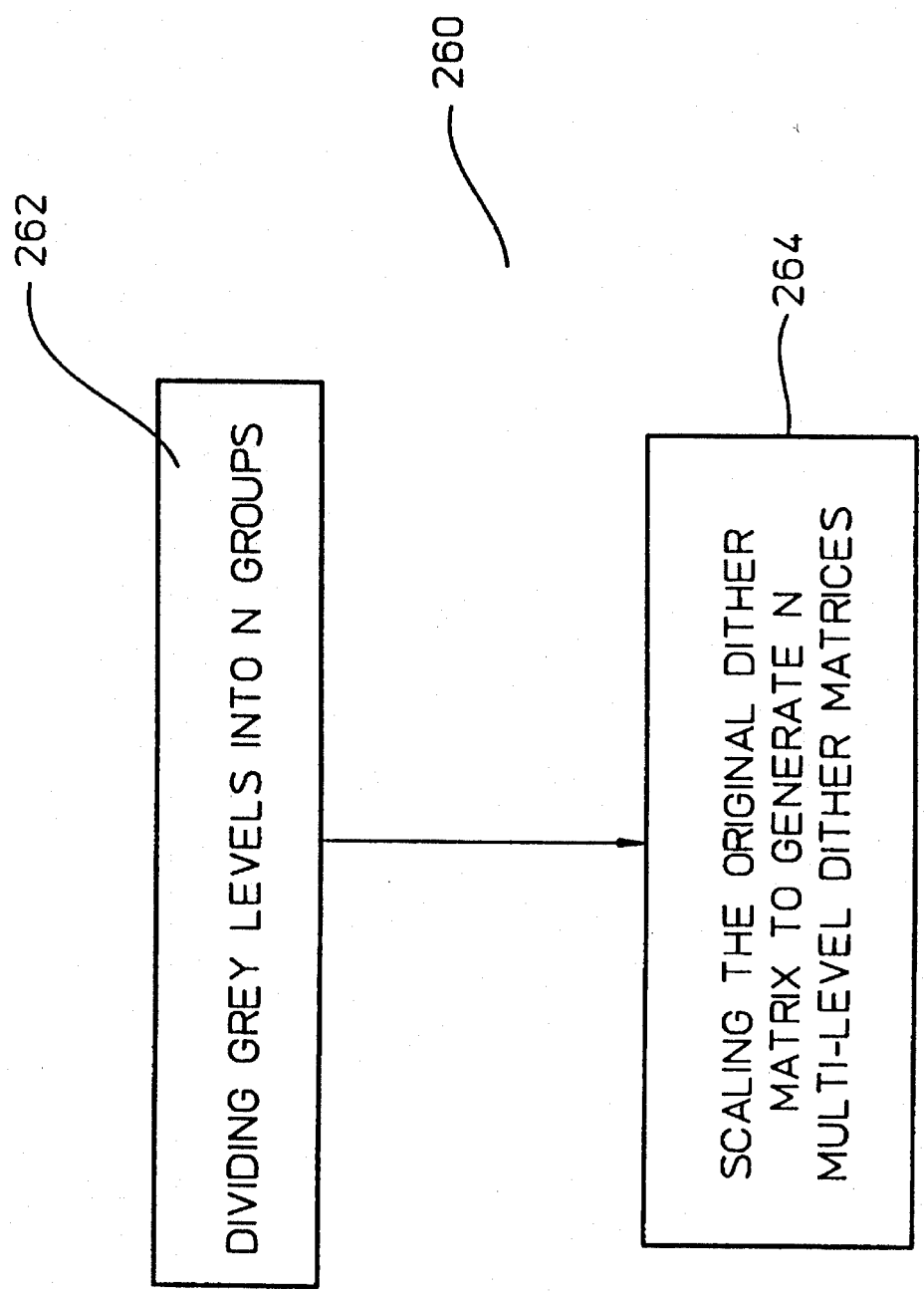
FIG. 3 shows one preferred way to form a multi-level dither matrix in the present invention.
Figure 4:
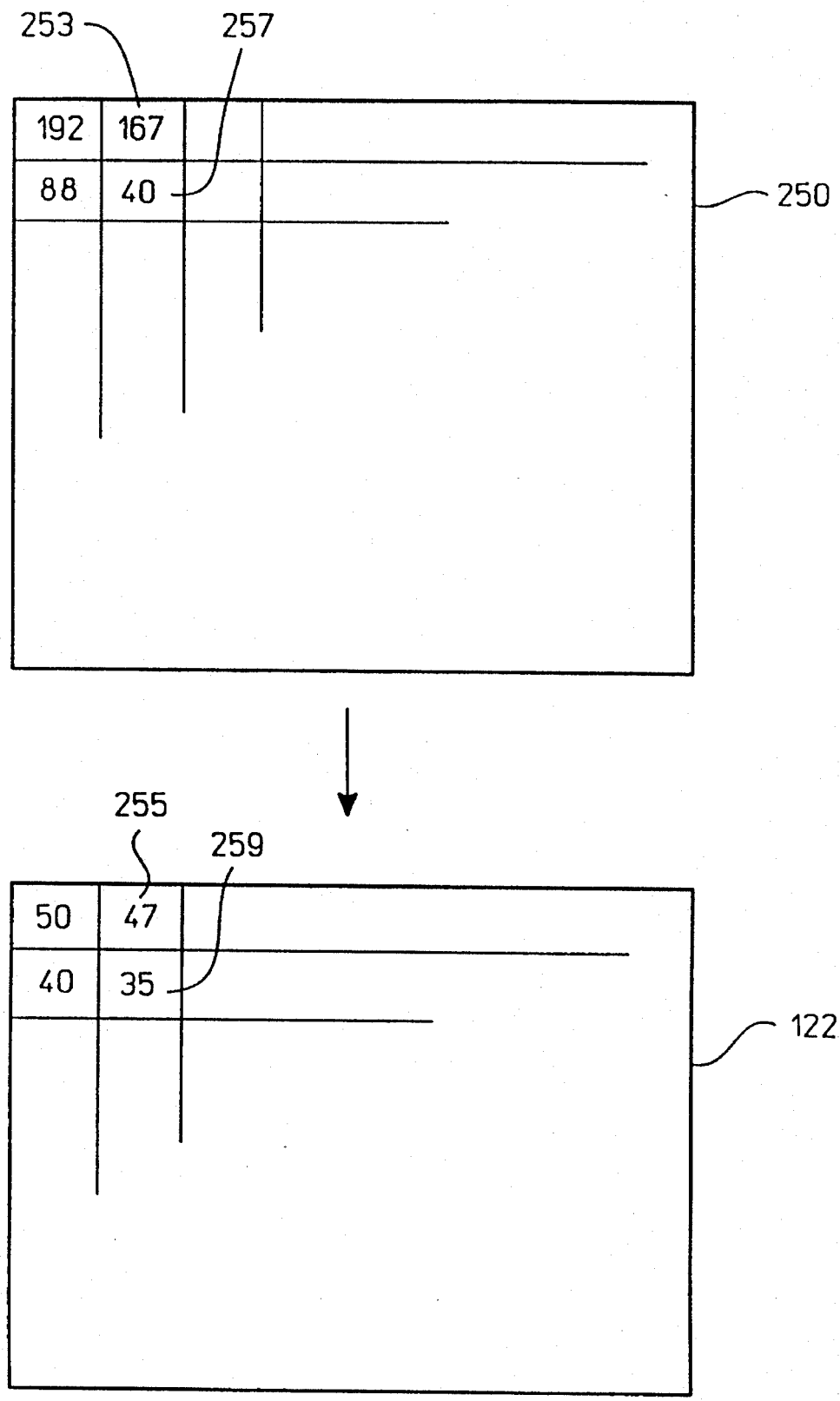
FIG. 4 shows one multi-level dither matrix formed by the method described in FIG. 3.

The multi-level dither matrices are formed through the groups of levels shown in FIG. 2 and an original dither matrix. FIG. 3 shows one preferred way 260 to form a multi-level dither matrix 122 as the one shown in FIG. 4. First, N groups of levels are formed, 262, as in FIG. 2. Then the matrices are formed through scaling 264 the original dither matrix according to the groups of levels. The original dither matrix 250 may be a Bayer matrix or other types of dither matrix with levels ranging such as from 1 to 255; the matrix is the type that has been used extensively to render an image and will not be further described in this application. The multi-level dither matrix 122 shown in FIG. 4 corresponds to the fourth group 206 of grey levels shown in FIG. 2, which covers the grey levels from 56 to 31. To form the multi-level dither matrix 122, the levels in the original dither matrix (1 to 255) are scaled according to the levels in the group 206, with grey levels ranging from 56 to 31; for example, the level 167 in the second pixel of the original dither matrix becomes the level 47 in the second pixel of the multi-level dither matrix using the following direct scaling calculation, with fractions rounded off:

(((56−31)/255)*167+31).

Figure 5:
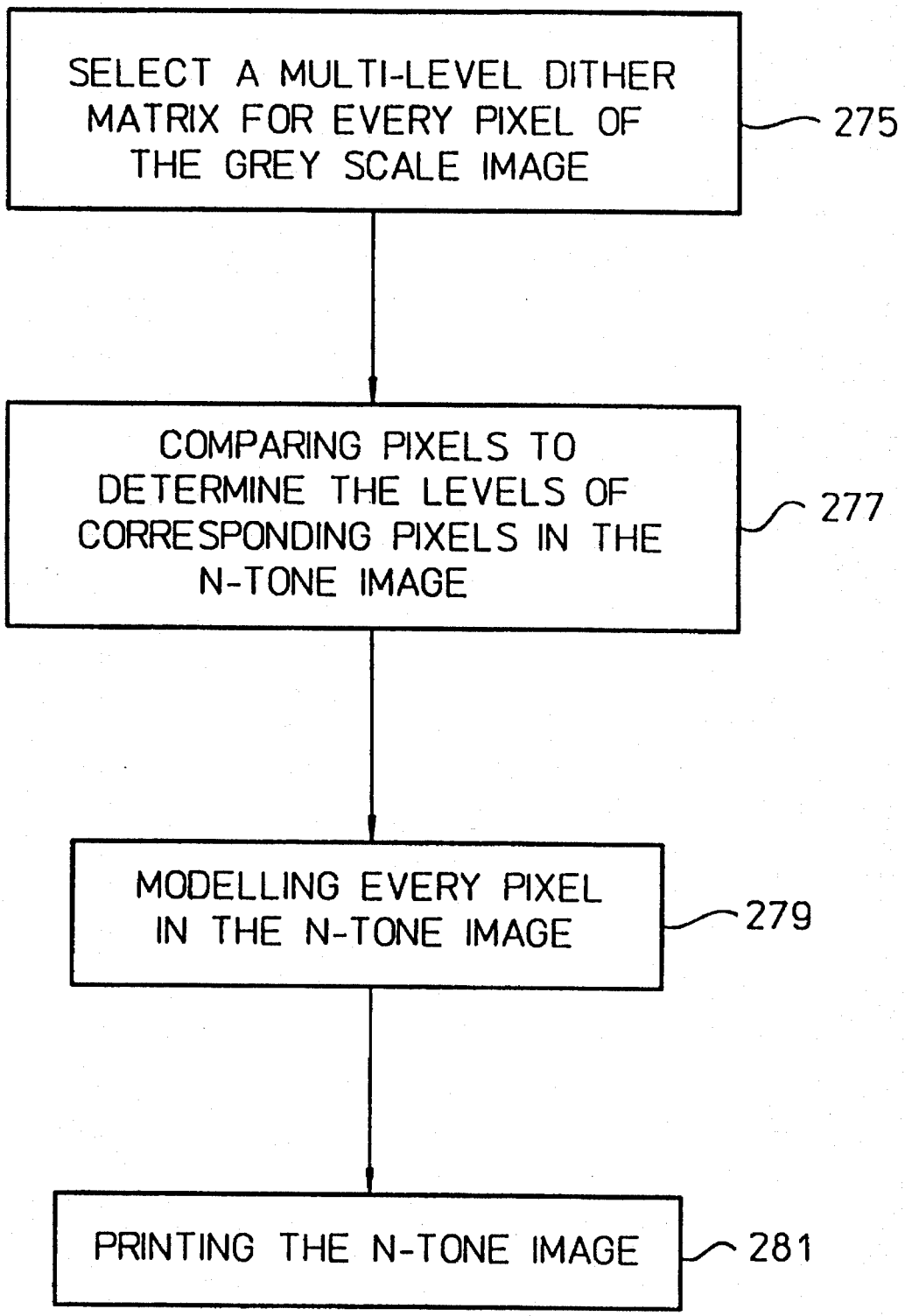
FIG. 5 shows one preferred way to form the N-tone image of the first preferred embodiment.

Similarly, the level 40 in the pixel 257 of the original dither matrix becomes 35 in the pixel 259 of the multi-level dither matrix. Based on the above method, the multi-level dither matrix 122 is formed. Using the original dither matrix and the 16 groups of grey levels shown in FIG. 2, sixteen multi-level dither matrices are generated by the direct scaling calculations. FIG. 5 shows a set of preferred steps to form the N-tone image, based on the multi-level dither matrices.

To generate the first intermediate N-tone image 101, every pixel in the grey scale image 106 is compared to and thresholded by a pixel in one of the multi-level dither matrices. For example, the first pixel 108 in the grey scale image 106 has the grey level 51. This grey level falls within the fourth group of grey levels shown in FIG. 2. The multi-level dither matrix 122, generated by the fourth group of grey level, is selected, 275. The first pixel of the grey scale image is then compared, 277, to the first pixel of the multi-level dither matrix 122. In the comparison process, first, one decides if the level of the pixel in the grey scale image is larger than or equal to the level in the corresponding pixel of the multi-level dither matrix; if it is, the group maximum level of the corresponding group generating the multi-level dither matrix is chosen for the first intermediate N-tone image; however, if the level of the pixel in the grey scale image is smaller, the group maximum level of the subsequent group is chosen for the first intermediate N-tone image. In the present example, with 51 bigger than 50, the group maximum level, 56, is chosen to be the level of the first pixel in the first intermediate N-tone image. For the second pixel, with 46 less than 47, the group maximum level of the subsequent group, 31, is chosen to be the level in the N-tone image. From the levels in the grey scale image and the multi-level dither matrices, the pixel-to-pixel comparison method, as described above, generates the first intermediate N-tone image 101.

The second intermediate N-tone image 103 is generated by two steps. First, each pixel in the first intermediate N-tone image 101 is represented or modelled, 279, by a number of contiguous sub-pixels, and then each sub-pixel is represented or modelled by a number of segments.

While not wishing to be bounded by theory, it is believed that some of the advantageous results of the invention are obtained through understanding the functionality of relatively low-cost printers. To generate an image with substantially imperceptible dots, every pixel is printed by, for example, a laser printer with a resolution of at least 600 pixels or dots-per-inch. The characteristics of each pixel is preferably controlled through a pulse with a pulse width. The pulse width can be sub-divided into a number of segments. Each segment can be at a high or a low intensity; at a high intensity means that the segment is dark or that the segment is turned on with the pulse width extending into the segment; and at a low intensity means the segment is light or the segment is turned off with the pulse width not extending into the segment. For a typical present-day 600 dots-per-inch laser printer, if the pulse is divided into eight segments, it is preferable to have more than one segment at a high intensity to generate a reproducible output. In other words, every segment at a high intensity preferably should have a neighboring segment also at a high intensity. Based on this representation, different levels of the image require different pulse widths or require selecting different number of segments. In order to generate more levels for the output image, every pixel in the N-tone image is represented or modelled by a number of pixels; the number of pixels is designated as sub-pixels. In one preferred embodiment, by combining four sub-pixels to generate different levels for each pixel, one gets N-tone images with a 300 dots-per-inch resolution; the N-tone images generated have substantially imperceptible dots for the unaided eyes of an ordinary person, with 20/20 vision, under normal condition. The above theory also applies to other relatively low-cost printers, such as ink-jet printers, by varying the intensity of each printed dot in a way similar to varying the pulse width in each pixel of a laser printer. Then, using the invented methods in the present invention, one may be able to generate images with substantially imperceptible dots.

Figure 6:
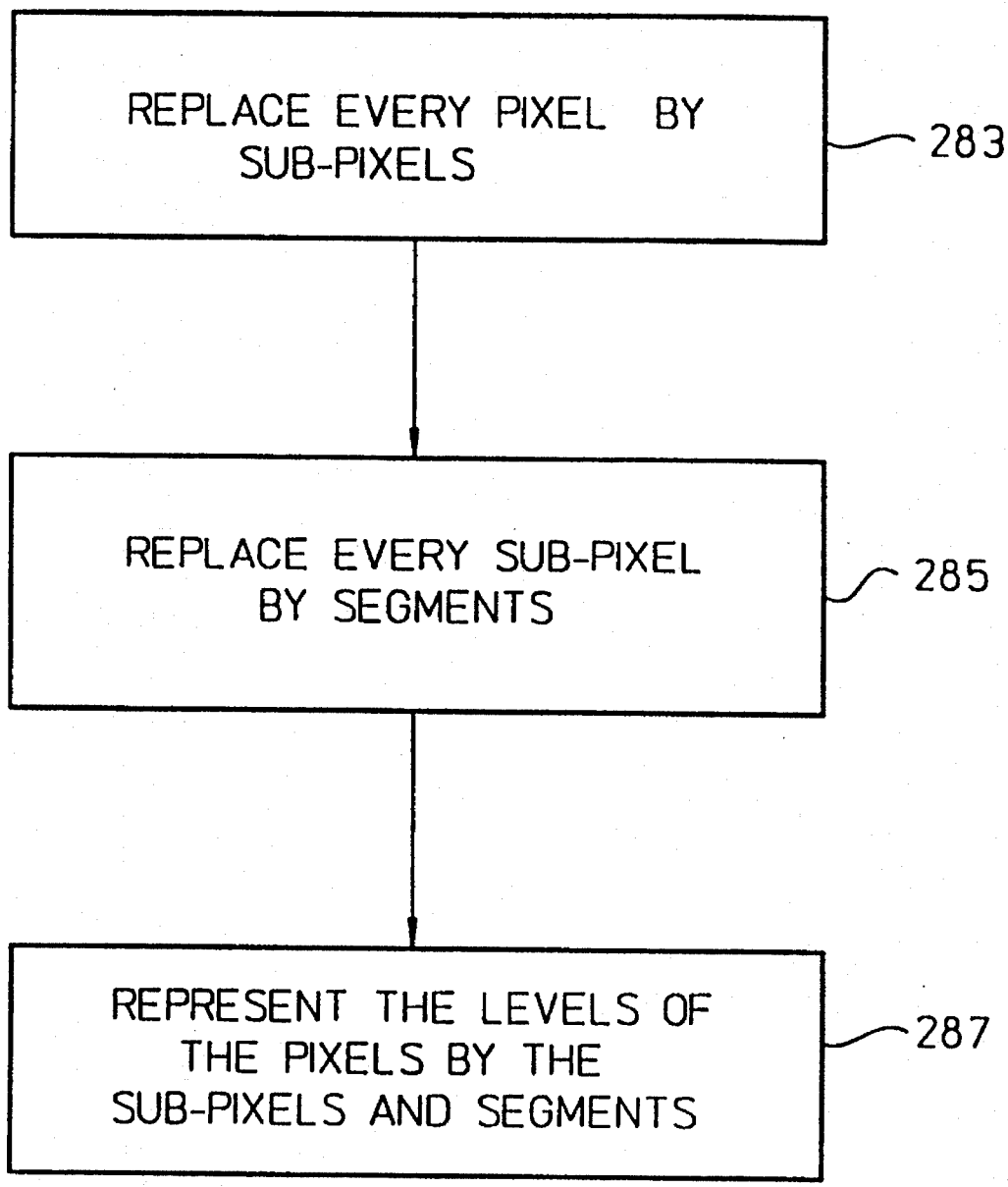
FIG. 6 shows one preferred way to generate sub-pixels and segments in the first preferred embodiment.
Figure 7:
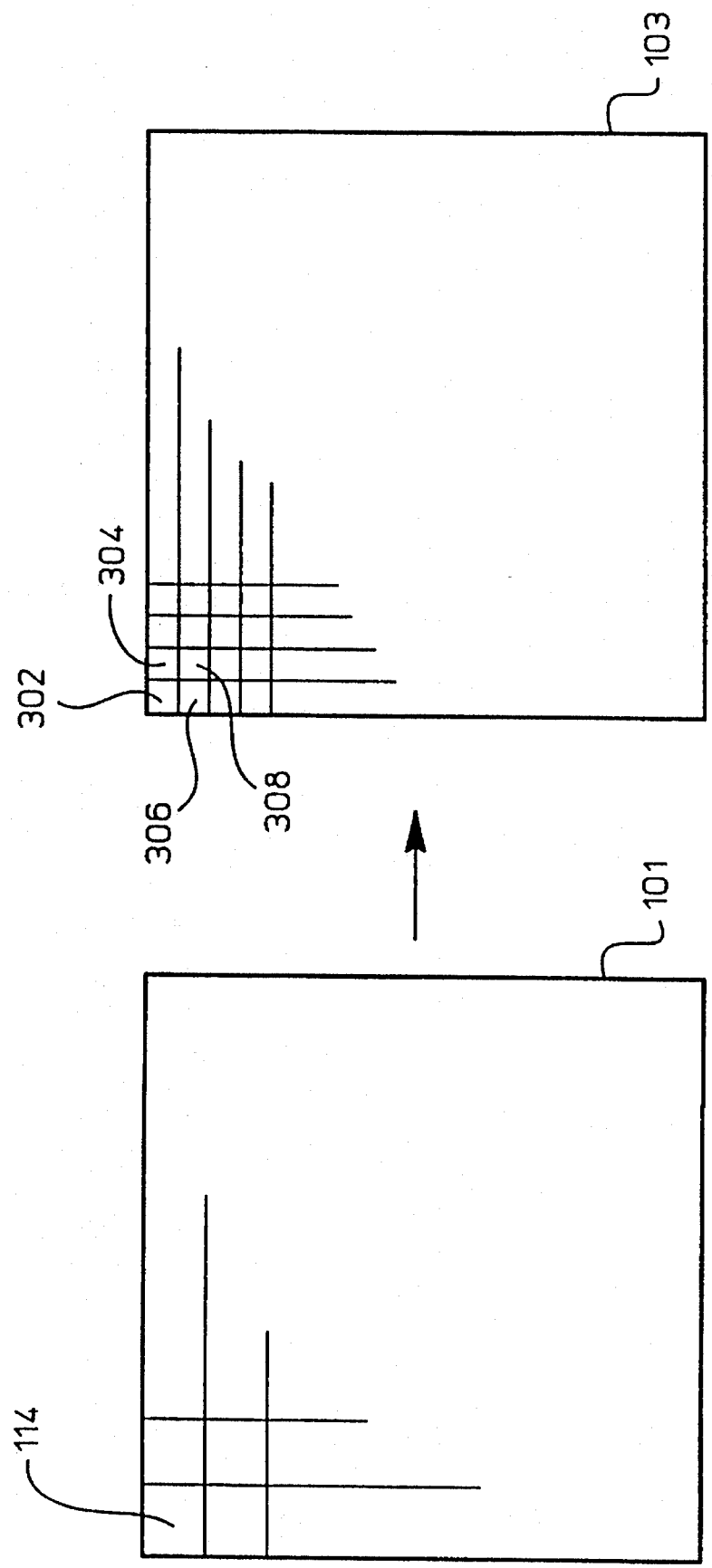
FIG. 7 shows the formation of sub-pixels in the first preferred embodiment.
Figure 8:
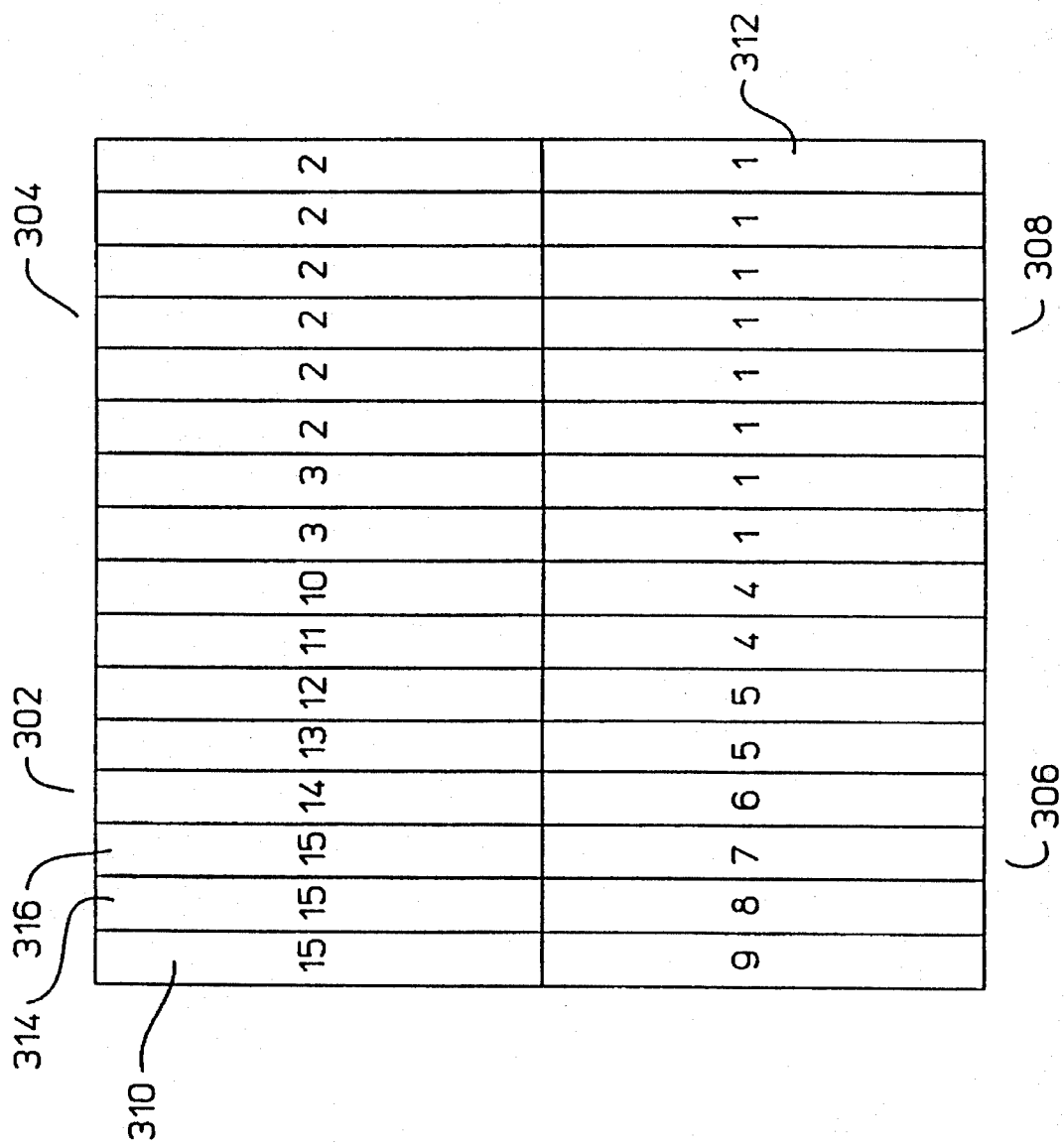
FIG. 8 shows one preferred sets of segments for four sub-pixels.

One example of using sub-pixels and segments is illustrated in FIGS. 7 and 8, with a set of preferred steps shown in FIG. 6. The example is based on a laser printer with 600 sub-pixels or dots-per-inch. FIG. 7 shows each pixel in the first intermediate N-tone image 101 being replaced, 283, by four contiguous sub-pixels; for example, the pixel 114 is replaced by the sub-pixels 302, 304, 306 and 308. FIG. 8 shows the four subpixels, with each sub-pixel replaced, 285, by eight segments. There is a number within each segment; for example, the segment 310 has a number of 15, and the segment 312 has a number of 1. The number inside the segment represents the level of the pixel when the segment is turned on or is at the high intensity. For example, for the level 15, the pulse width extends across three segments, the segment 310, 314 and 316; for the level 1, the darkest level, the pulse width extends across all the segments; and for the level 16, no segment is turned on or all segments are at the low intensity. Thus, the level of each pixel is represented, 287, by the segments and the sub-pixels.

The sixteen levels have perceptibly different levels of grey. One preferred way to decide which segment to be turned on for which level is based on one's visual perception. In the present embodiment shown in FIG. 8 with 32 segments, the segments are turned on one after the other, with the level created measured by a densitometer, which measures the density of a level. Theoretically, there could be 33 levels from the 32 segments, but many levels are visually indistinguishable. Those indistinguishable levels are grouped as one level, for example the numerous segments grouped together for level 1 and level 2. In this embodiment, sixteen distinguishable levels are selected. Another observation in the preferred embodiment using 600 sub-pixels or dots-per-inch laser printers is that the lightest level 15 preferably needs more than 1 segments. The effect of a segment turned on by itself without any neighboring segments being turned on may not be very reproducible. Thus, the lightest level preferably needs more than one segment to be turned on. However, once there are segments turned on, subsequent levels may only need one additional segment to be perceptibly different. For example, the level 14 only has one more segment turned on, as compared to the level 15. In this embodiment, the number of segments between levels are not uniform; for example, the difference between levels 16 and 15 is 3 segments, and the difference between levels 15 and 14 is 1 segment only.

Another preferred way to decide which segment to be turned on for which level is to retain the 33 levels for the 32 segments. A number of levels may not be visually distinguishable, and one needs 6 bits to designate all the levels. If the number of bits is of concern, one may remove one level, and then only 5 bits would be needed to designate the 32 levels.

The above example is based on a 600 sub-pixels or dots-per-inch laser printer. A laser printer with higher resolution can be used. The number of sub-pixels for each pixel does not have to be 4. The number of segments for each sub-pixel does not have to be 8. By experimenting with the number of segments, the number of sub-pixels and the dot size, one, based on the teachings in the present disclosure, can generate images with substantially imperceptible dots, with a different resolution, a different number of sub-pixels and a different number of segments.

Figure 9:
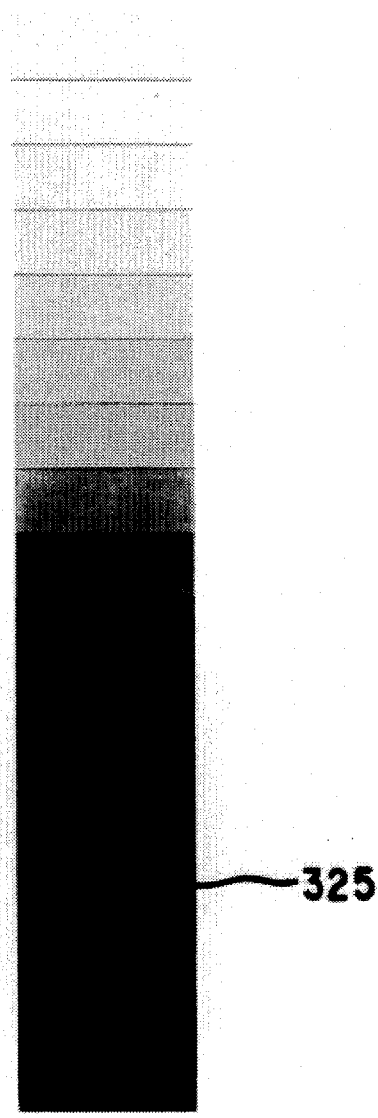
FIG. 9 shows the 16 levels printed using the different segments in FIG. 8.

FIG. 9 shows the 16 levels printed out using the different pulse widths or segments shown in FIG. 8. For example, the fourth square block, 325, is the fourth level. As shown in FIG. 8, all the segments having number 4 or higher in it will be turned on, which means that pulses are turned on for three sub-pixels, 304, 304 and 306; in other words, 24 of the 32 segments are turned on.

Figure 10:
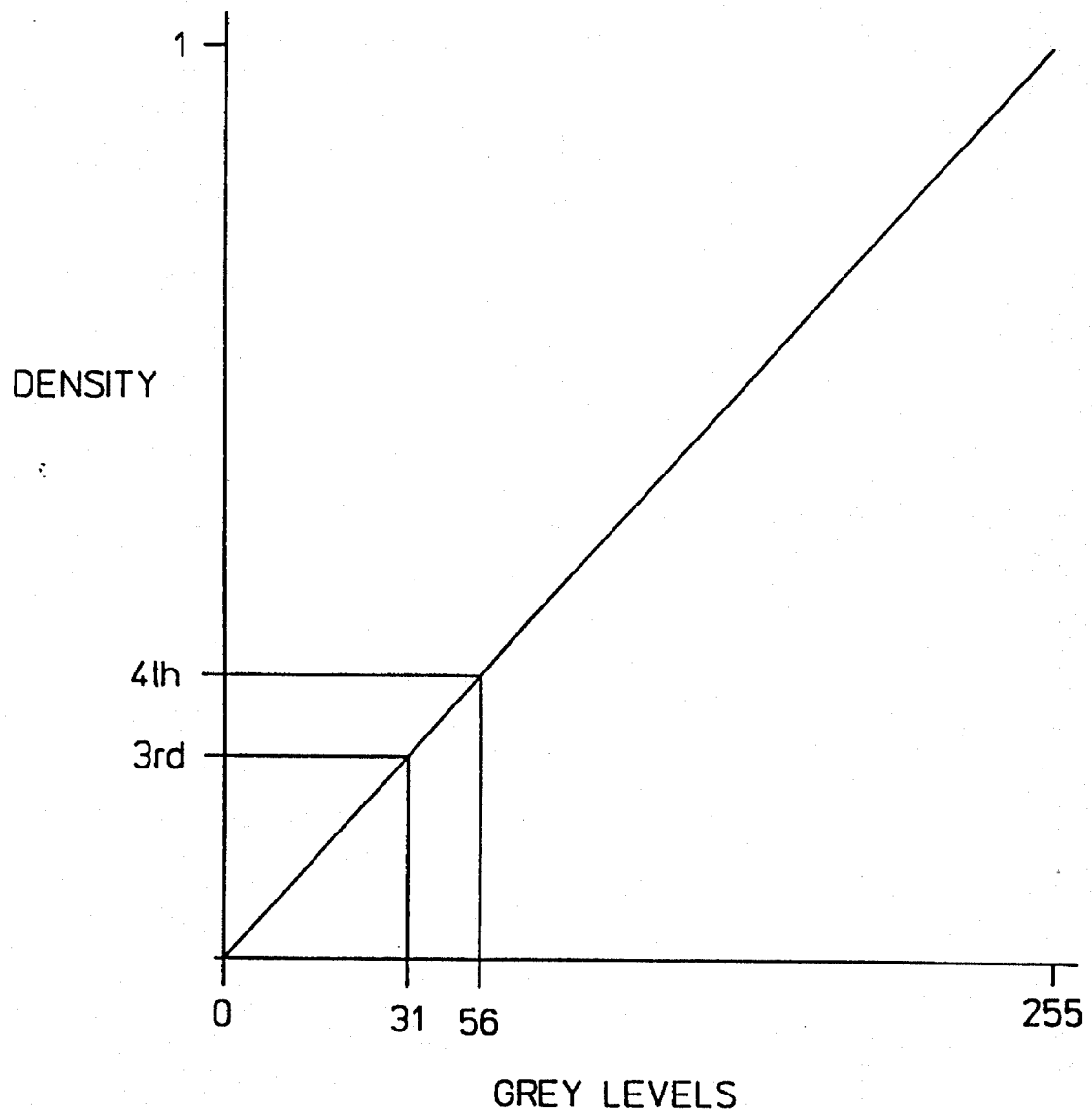
FIG. 10 shows the relationship between the grey levels and the density of each level in the N-tone image of the first preferred embodiment.

The 16 levels shown in FIG. 9 are measured by the densitometer. The density of each level of the N-tone image is related back to the grey levels of the grey scale image. In one preferred embodiment, the relationship is assumed to be linear. FIG. 10 shows the relationship between the grey levels and the density of each level of the N-tone image. Each level in FIG. 9 is mapped to a group or a range of grey levels. For example, the fourth level approximately has a grey level of 56, and the third level has 31; so the fourth group of levels covers the grey levels from 56 to 31. This is one preferred method to determine all the groups of grey levels in FIG. 2.

Figure 11:
FIG. 11 shows a picture printed by the first preferred embodiment.

From the second intermediate N-tone image 103, the N-tone image 102 is printed, 281, by the printer 104. In the present embodiment, one way to represent a segment being turned on is to use a value of 1, and a segment being turned off by a value of 0. The segments with 1 in them will be printed. FIG. 11 shows a picture printed out by the first preferred embodiment. The image has 300 dots or pixels per inch. Each pixel is represented by 4 sub-pixels, and each sub-pixel by 8 segments. There are altogether 32 segments for each pixel. In this embodiment, each pixel only has 16 levels, which can be represented by 4 bits. Thus, with an increase of 4 bits for every pixel, for an ordinary person, the figure generated has substantially imperceptible dots. Any dots in the figure, such as those on the apple, are in the original grey scale image.

A second preferred embodiment of the present invention is similar to the first except one does not have to vary the pulse width, or use different segments for each sub-pixel in the second intermediate dither matrix 103. The N-tone image is generated, for example, through an original Bayer matrix with 8 by 8 pixels.

Figure 12:
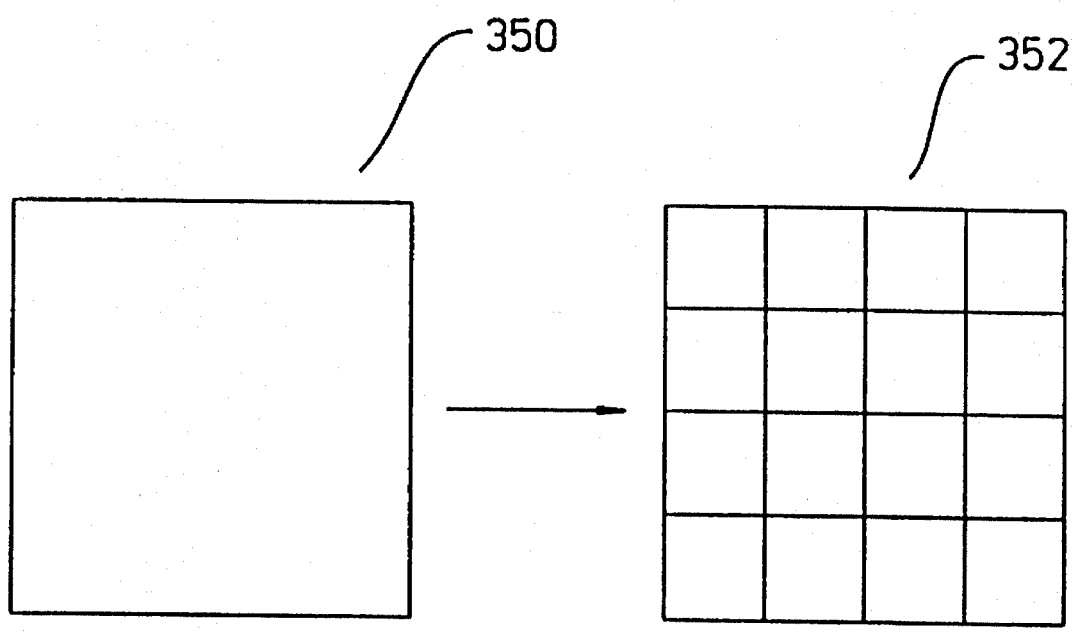
FIG. 12 shows an example for the second preferred embodiment, with 16 contiguous sub-pixels to form one pixel.
Figure 13:
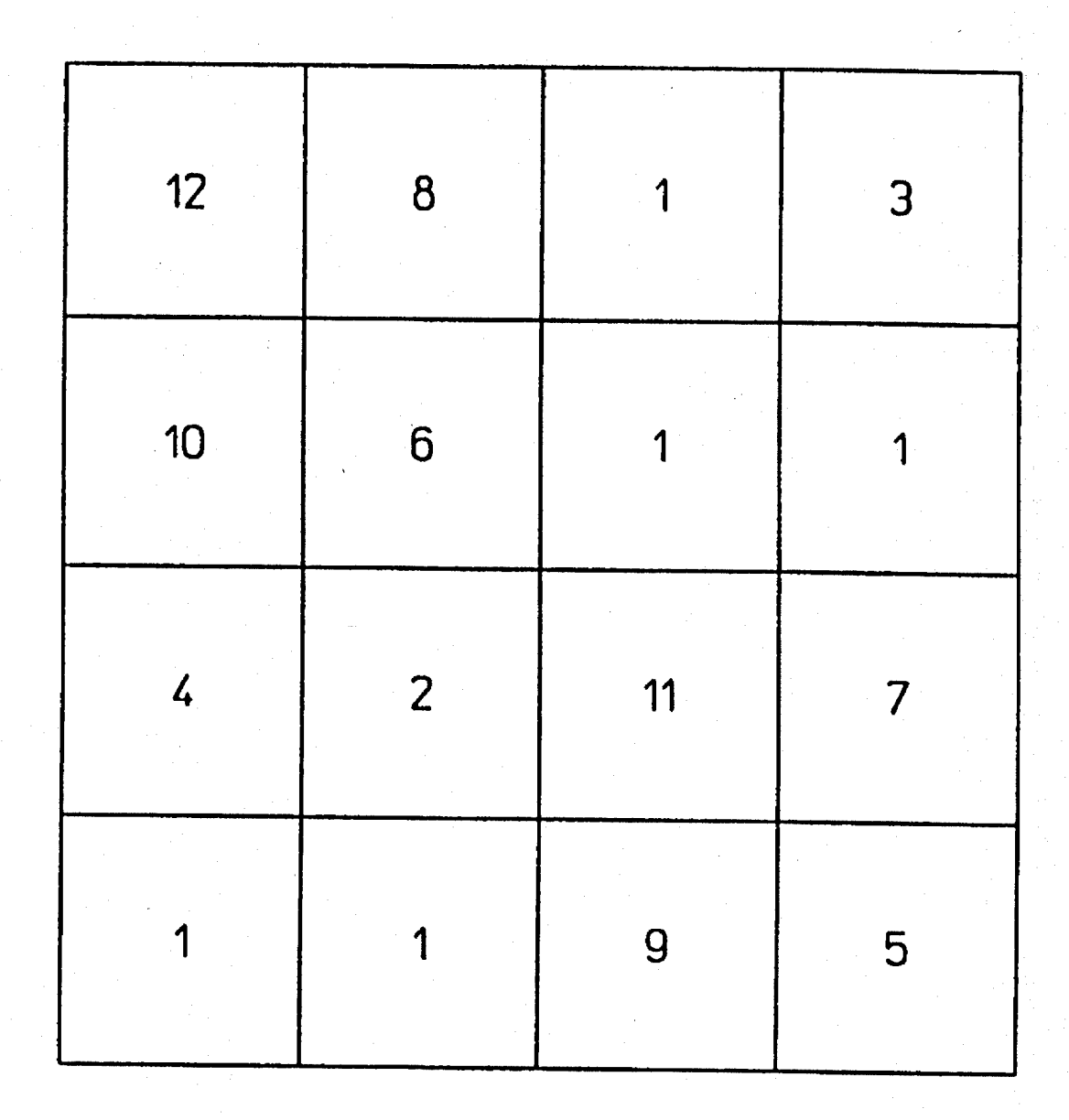

In one example of the second embodiment, every pixel is represented or modelled by 16 contiguous sub-pixels, as shown in FIG. 12. FIG. 13 shows the turn-on sequence of the sub-pixels to generate 13 different levels. For example, if one prefers the fourth level, every sub-pixel labelled 4 or higher will be turned on, or will have a dot printed in it. This turn-on sequence is determined based on a classical screen or cluster dot at 45° model; such model should be obvious to those skilled in the art and will not be further described here. From the 13 levels, a densitometer generates 13 groups of levels according to a graph similar to FIG. 10. FIG. 14 shows the groups of levels found. Again, the separations between the groups of levels are not uniform.

From the 13 groups of levels in FIG. 14, the original Bayer matrix forms 13 multi-level dither matrices. From the multi-level dither matrices, the first intermediate dither matrix 101 is generated. Based on the 13 levels as shown in FIG. 13, the second intermediate N-tone image and the N-tone image are produced as in the first preferred embodiment.

Figure 15:
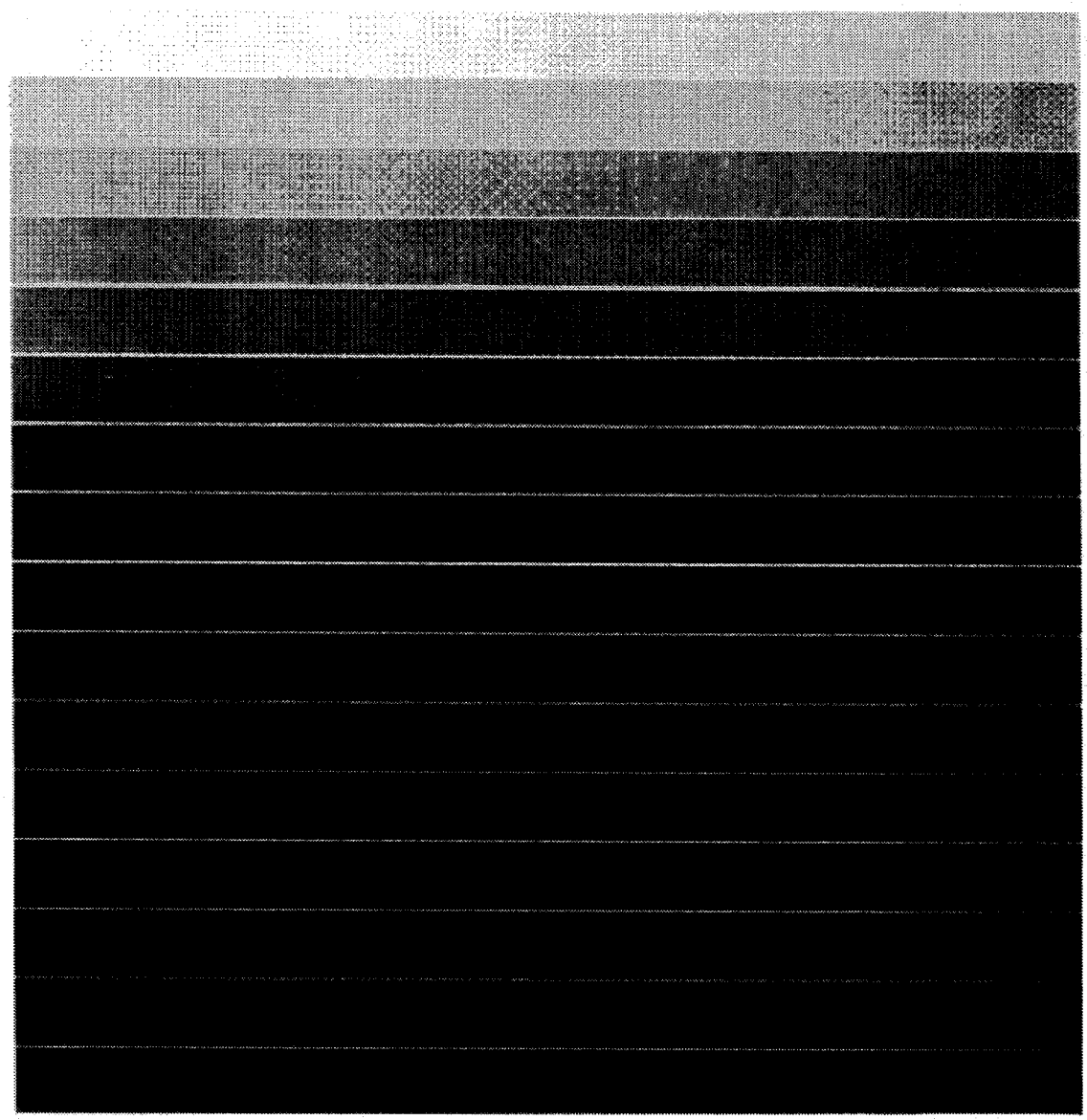
FIG. 15 shows the grey ramp generated based on the second preferred embodiment of the present invention.
Figure 16:
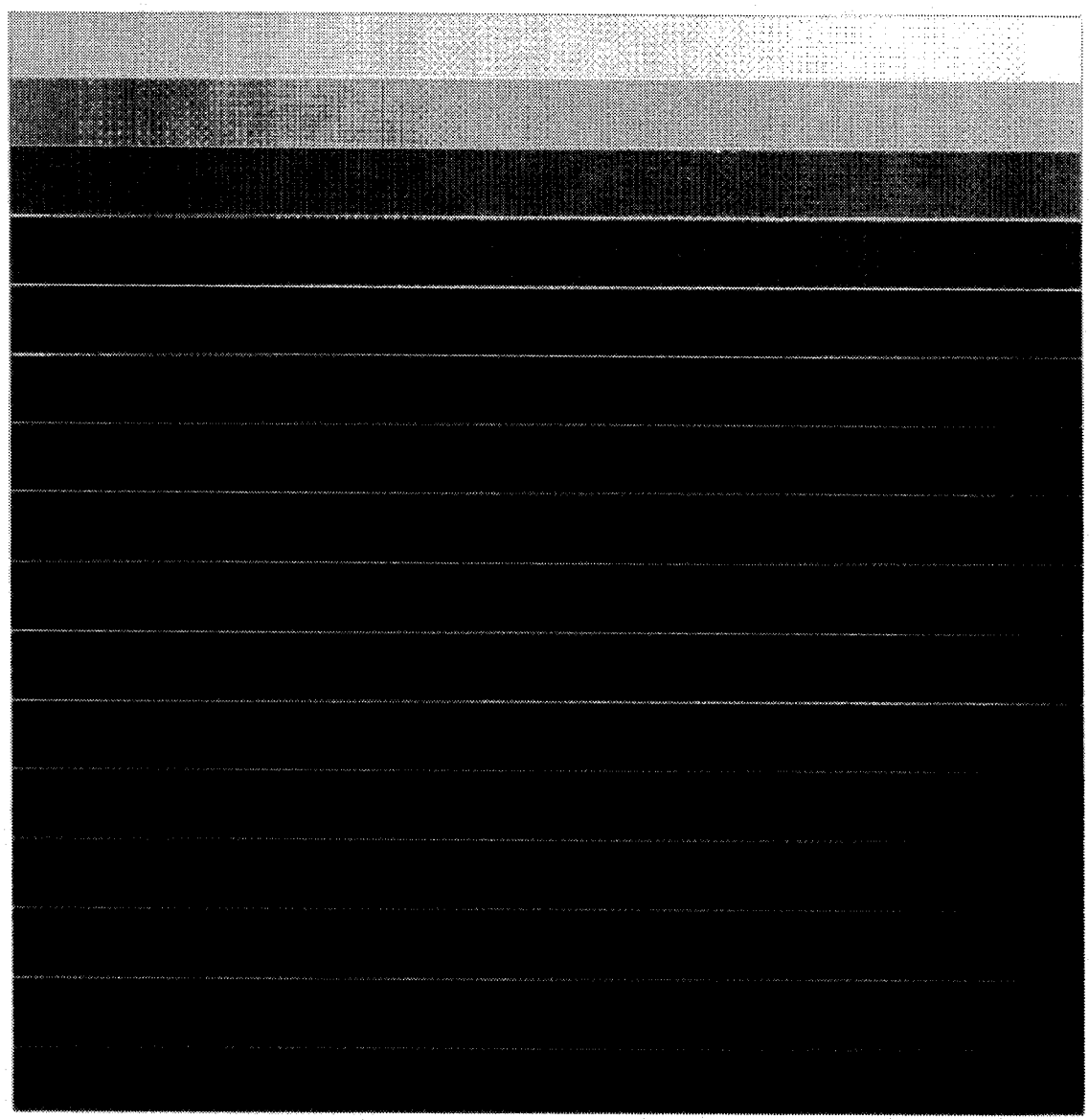
FIG. 16 shows a prior art grey ramp printed using a Bayer matrix.

FIG. 15 shows the grey ramp with 256 grey levels generated based on the second preferred embodiment with multi-level Bayer matrices and the 13 levels. The pixels have a resolution of 75 dots-per-inch, and the sub-pixels at 300 dots-per-inch. FIG. 16 shows a prior art grey ramp at 300 dots-per-inch with 256 levels, printed using a Bayer matrix with 8 by 8 pixels. The grey ramp in FIG. 15 has significantly more distinguishable grey levels than the grey ramp in FIG. 16. Moreover, the transition between grey levels in FIG. 15 are more smooth than those in FIG. 16. These effects are more obvious to a viewer if the two figures are viewed side-by-side at a distance, such as 2 feet away from the viewer.

For a third preferred embodiment, its main difference from the first preferred embodiment is that the multi-level dither matrices are replaced by a multi-levelling error diffusion technique to generate the first intermediate N-tone image 101. In the normal error diffusion technique, the error from each pixel is compared to the middle grey scale level of the grey scale image, with the errors diffused to its surrounding pixels. Error diffusion techniques are well-known to those with ordinary skill in the art and will not be further described in the specification. For the preferred multi-level error diffusion technique in the present invention, the level in each grey scale image pixel again maps to a corresponding group of grey levels, such as the one shown in FIG. 2. The level in each pixel of the grey scale image is compared to the middle level of its corresponding group of levels, and the error is again diffused to its corresponding pixels to generate the first intermediate N-tone image 101. For example, the first pixel 108 with a level of 51 is compared to the level 43 (the average of 56 and 31), and the error is diffused to its neighbors.

Figure 17:
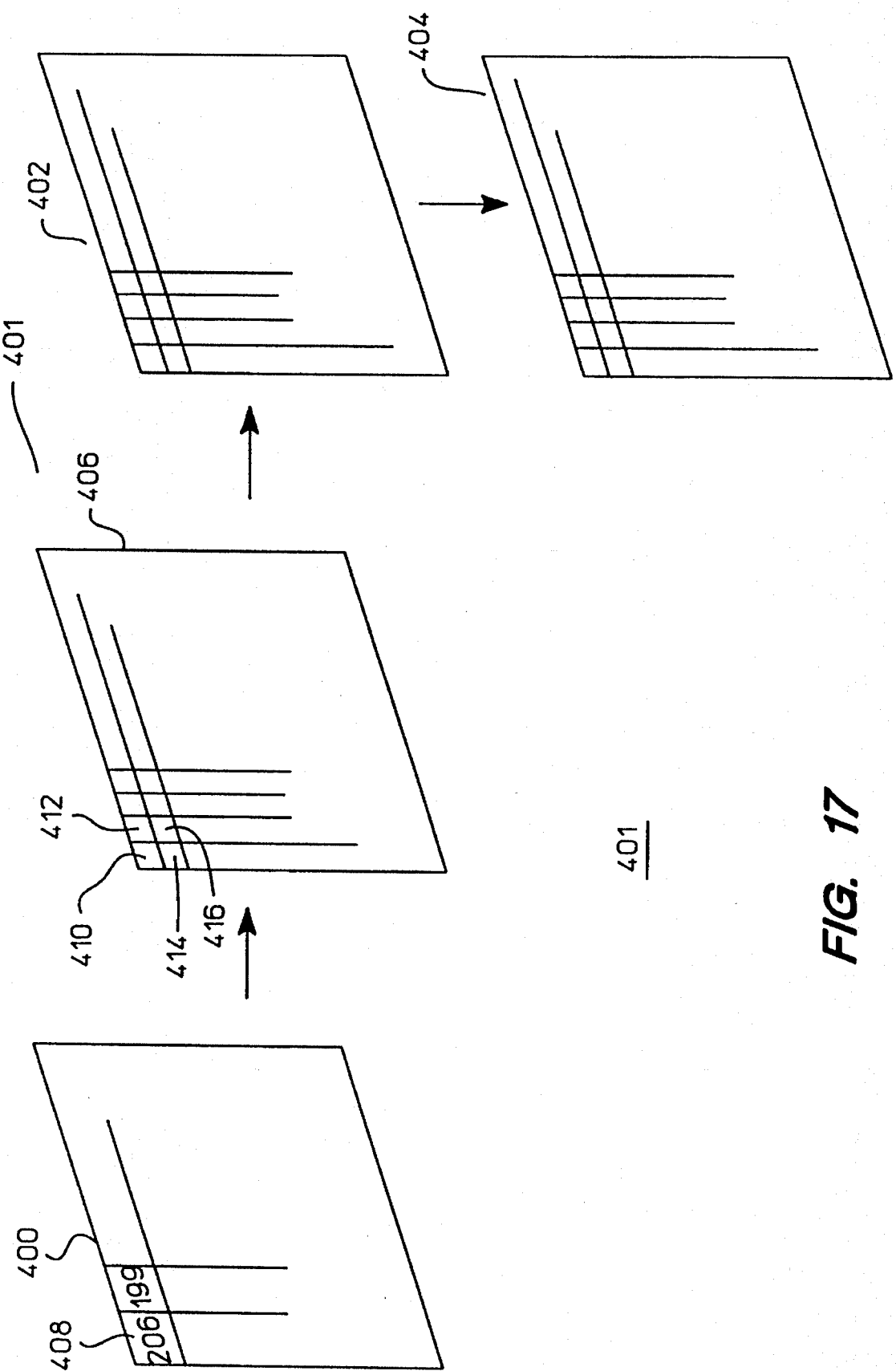
FIG. 17 shows a part of a fourth preferred embodiment of the present invention.
Figure 18:
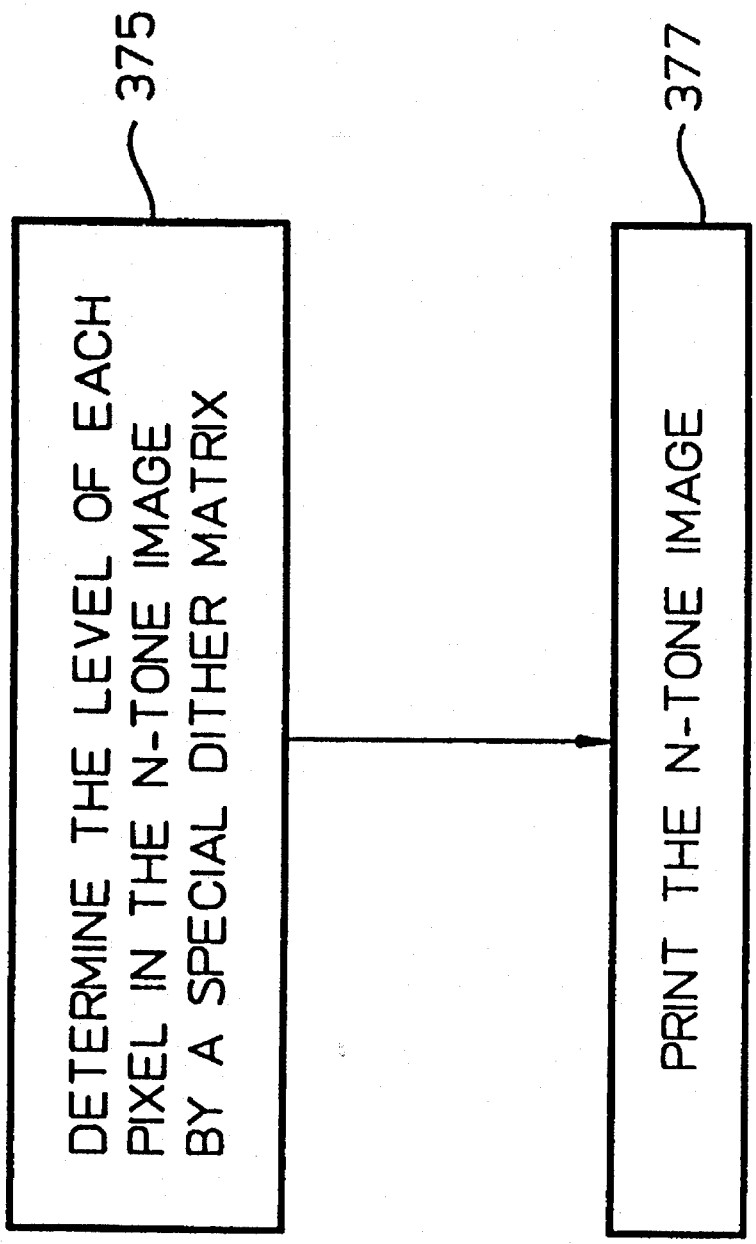
FIG. 18 shows a preferred way for the fourth preferred embodiment.

FIG. 17 shows a portion of a fourth preferred embodiment 401 of the present invention, with a set of preferred steps shown in FIG. 18. The difference between the first and the fourth embodiment is that the fourth embodiment reduces the number of steps in the first embodiment by collapsing many steps into one special dither matrix. In this embodiment, the level of each segment in a second intermediate N-tone image 404 is determined by a pixel-to-pixel comparison between the grey scale image 400 and the special dither matrix 402. Based on the comparisons, the level in each pixel of the N-tone image is determined, 375. Then, from the second intermediate N-tone image 404, the N-tone image is printed, 377, by the printer. In another embodiment, one preferably does not need to determine, 375, the level in each pixel. All the segments in the second intermediate N-tone image 404 are sent as a bit map to the printer 404, and the bit map is printed directly.

In one preferred embodiment, as shown in FIG. 17, every pixel in the grey scale image 400 is subdivided into a group of contiguous segments to form a finer-resolution grey scale image 406. All the segments for each pixel may have the same grey level as its corresponding pixel in the grey scale image 400; for example, the first pixel 408 with a level of 206 is subdivided into thirty-two contiguous segments, such as 410, 412, 414 and 416; all the segments have the level of 206. For another embodiment, the finer-resolution grey scale image 406 actually has a finer resolution than the grey scale image 400; for example, thirty-two times higher in resolution. After the sub-division, each segment in the finer-resolution grey scale image is compared to its corresponding segment in the special dither matrix 402.

Figure 19:
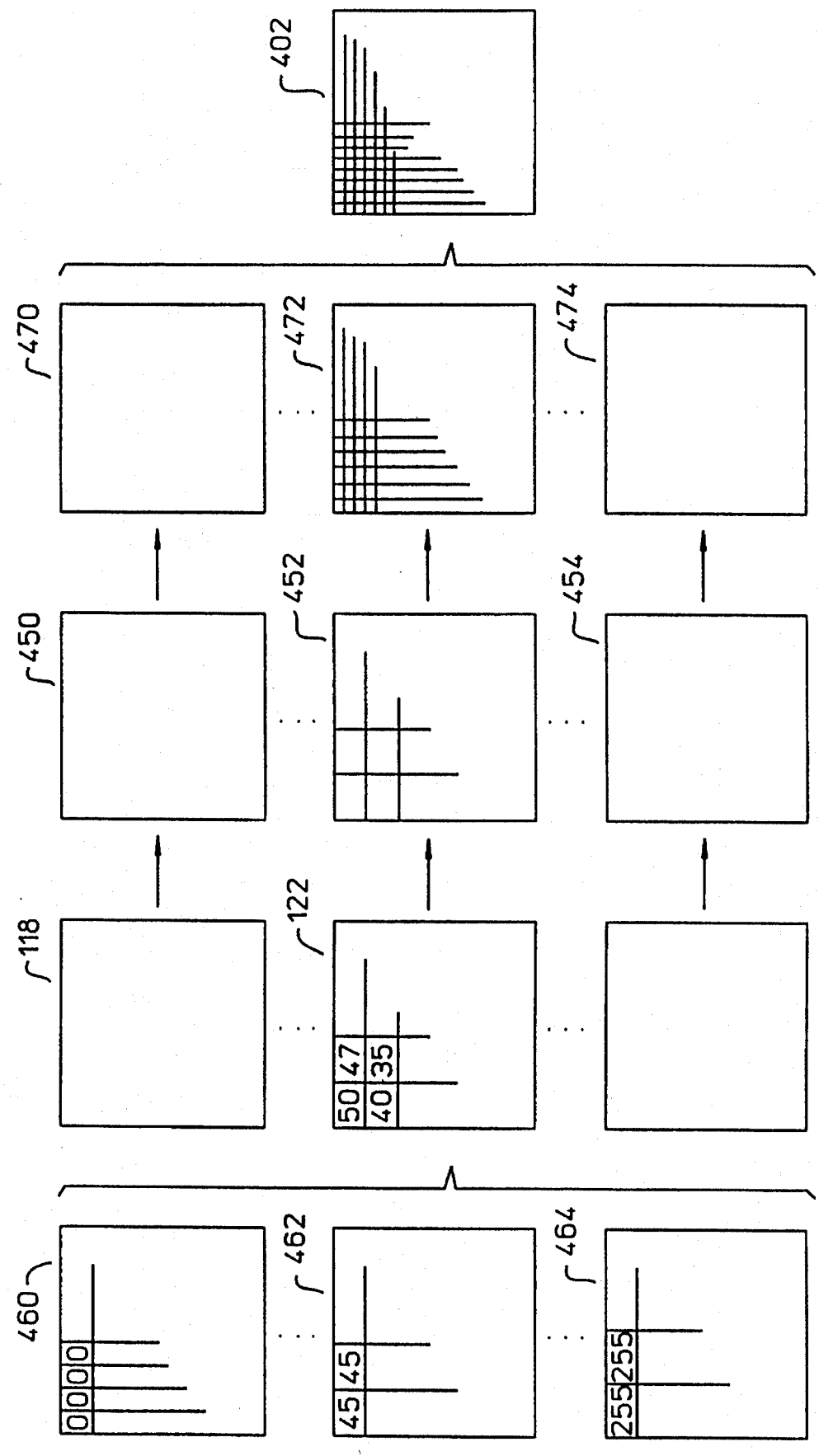
FIG. 19 shows graphically one preferred way to form the special dither matrix in the fourth preferred embodiment.
Figure 20:
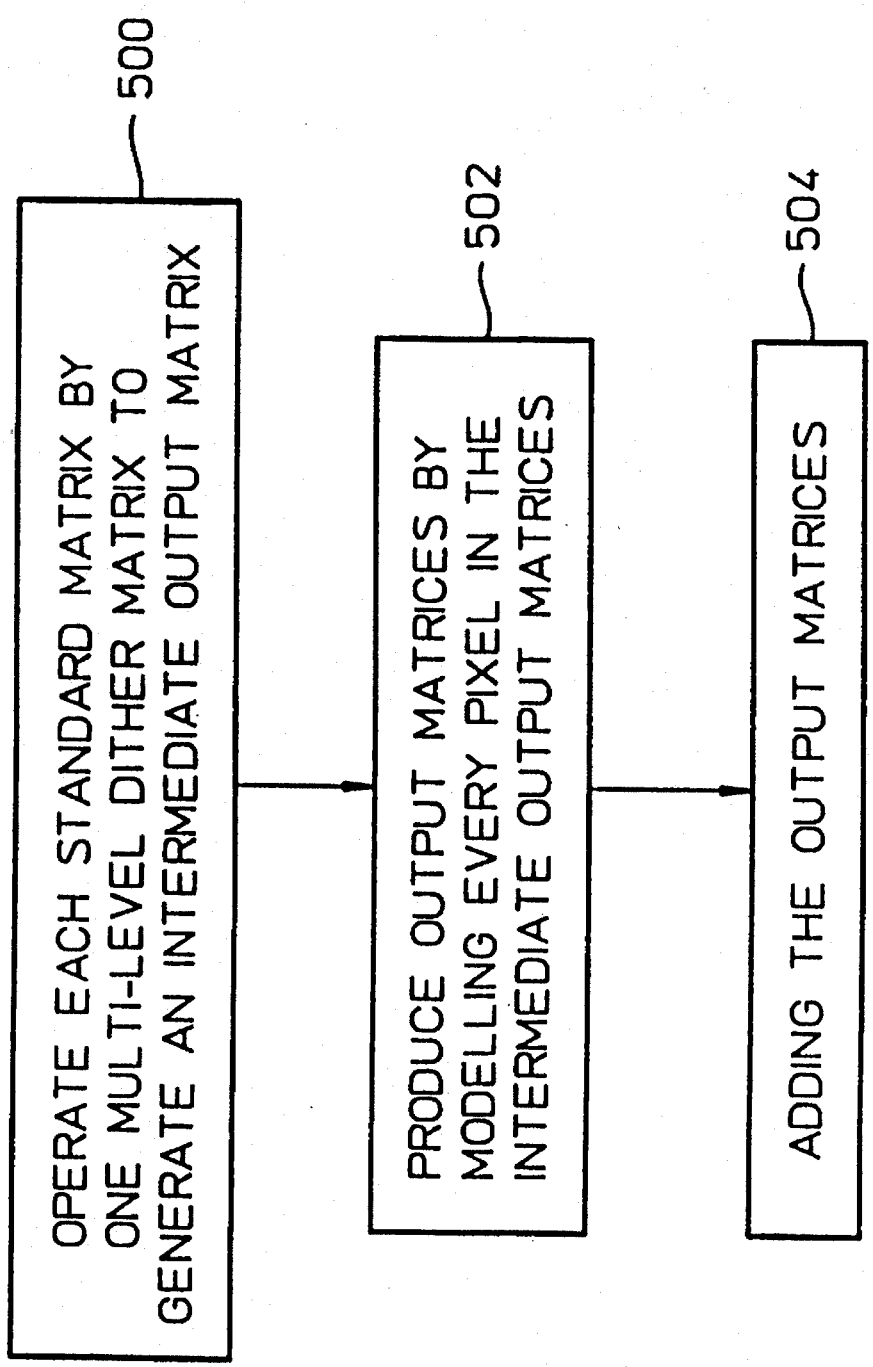
FIG. 20 shows a set of preferred steps to form the special matrix in FIG. 19.

FIG. 19 graphically shows one preferred way to form the special dither matrix 402, with a set of preferred steps shown in FIG. 20. As an overview, many standard grey scale images, such as 460, 462 and 464, are first compared, 500, to the multi-level dither matrices, such as 118 and 122, to produce many intermediate output matrices, such as 450, 452 and 454. Then, every pixel in the intermediate output matrices is replaced by a group of contiguous sub-pixels as in the first preferred embodiment to form, 502, many output matrices, such as 470, 472 and 474. All the output matrices are added, 504, together to form the special dither matrix 402.

In more detail, every pixel in each standard grey scale image has the same grey level. For example, all the pixels in the standard grey scale image 460 has the grey level 0. The grey scale image may have 256 levels. In order to cover all the levels, there are preferably 256 standard grey scale images.

The multi-level dither matrices are generated as in the first preferred embodiment. For each standard grey scale image, its pixels are compared to one corresponding multi-level dither matrix to generate its intermediate output matrix. The comparison is similar to the comparison in the first preferred embodiment. For example, the standard grey scale image 462 has the level of 45 for all its pixels. Its corresponding multi-level dither matrix is 122, which covers the levels from 56 to 31. Thus, every pixel in the standard grey scale image 462 is compared to its corresponding pixel in the multi-level dither matrix 122 to generate the intermediate output matrix 452.

All the intermediate output matrices are transformed to their corresponding output matrices by replacing every pixel with a group of contiguous segments. This replacement process is similar to the replacement process in generating the second intermediate N-tone image from the first intermediate N-tone image in the first embodiment. For example, each pixel in the intermediate output matrices is replaced by 32 segments with their corresponding intensity to represent the level of each pixel; the segments that should be turned on have one in them, and those that should be turned off have zero. After the replacement, every intermediate output matrix becomes its corresponding output matrix. For example, the intermediate output matrix 452 becomes the output matrix 472 after the replacement process. All the output matrices are then added together by matrix addition to produce the special dither matrix 402.

A Bayer matrix may be used for the fourth preferred embodiment. The difference is that every pixel in the intermediate output matrix is not replaced by segments, but by sub-pixels only, as in the second preferred embodiment. A sub-pixel that should be turned on has one in it and the one that should be off has a zero in it.

From the foregoing it should be appreciated that the present invention generates visually pleasing N-tone images in a relatively inexpensive manner. The above description can be extended to color images. For a color N-tone image, the invented method is repeated at least two more times, each time for a different color to generate the color N-tone image. The present invention can also be extended to a display with the N-tone image shown on the display, instead of printed on a printer. In fact, the printing step in the present invention includes displaying, with the printer in the present invention being a display.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. A method of generating a N-tone image from a grey scale image, both images having a plurality of pixels, each pixel in the grey scale image having a level that is one of N levels with N bigger than two and less than the number of grey levels available for the grey scale image, the method comprising the steps of:

determining the level of each pixel in the N-tone image based on the level of its corresponding pixel in the grey scale image, and based on a technique selected from the list of (1) a technique based on an original dither matrix and (2) an error diffusion technique;

modeling every pixel by replacing it with a plurality of dots, and every dot with a plurality of segments, each segment having an intensity whose value depends on the level of the pixel; and printing the N-tone image by a printer based on the modeling step; such that:

N substantially reproducible levels can be generated for each pixel by its corresponding segments, each with its corresponding intensity;

the printer generates pulses to print the pixels; each pulse has a width; and the width is controlled to generate the segments.

2. A method as recited in claim 1 wherein the N-tone image has substantially imperceptible dots.

3. A method as recited in claim 1 wherein the difference in the number of segments with a certain intensity representing adjacent levels are not uniform.

4. A method as recited in claim 1 wherein the N-tone image has a resolution approximately equal to or greater than 300 pixels or dots-per-inch.

5. A method as recited in claim 1 wherein:

each pixel is represented by 4 dots; and each dot is represented by 8 segments.

6. A method as recited in claim 1 wherein the step of determining the level is based on a Bayer matrix.

7. A method as recited in claim 1 wherein:

the N-tone image is generated by a laser printer; and the step of modeling includes using a pulse for each dot, the pulse having a width, which is related to the intensity of each segment for its corresponding dot.

8. A method as recited in claim 1 wherein the intensity of each segment is selected from the list of (1) a high intensity and (2) a low intensity such that every segment at a high intensity has an adjacent segment which is also at a high intensity.

9. A method as recited in claim 3 wherein the intensity of each segment is selected from the list of (1) a high intensity and (2) a low intensity such that every segment at a high intensity has an adjacent segment which is also at a high intensity.

* * * * *